United States Patent
Haught et al.

(10) Patent No.: US 7,823,237 B2
(45) Date of Patent: Nov. 2, 2010

(54) METHODS FOR CLEANING LAUNDRY WITH REDUCED SORTING

(75) Inventors: John Christian Haught, West Chester, OH (US); Mark William Glogowski, Cleves, OH (US); Robb Richard Gardner, Cincinnati, OH (US); Andre Cesar Baeck, Bonheiden (BE); Andre Christian Convents, Diegem (BE); Johan Smets, Lubbeek (BE); Pascale Claire Annick Van Steenwinckel, Weerde (BE); Peter Gerard Gray, Brussels (BE); Graeme Duncan Cruickshank, Newcastle upon Tyne (GB); Adam Costello, North Tyneside (GB); Michael Duncan, Northumberland (GB)

(73) Assignee: The Procter & Gamble Company, Cincinnati, OH (US)

( * ) Notice: Subject to any disclaimer, the term of this patent is extended or adjusted under 35 U.S.C. 154(b) by 1264 days.

(21) Appl. No.: 11/130,500

(22) Filed: May 17, 2005

(65) Prior Publication Data

US 2005/0261157 A1 Nov. 24, 2005

(51) Int. Cl.
*D06F 35/00* (2006.01)

(52) U.S. Cl. .......................... 8/158; 68/12.01; 68/17 R

(58) Field of Classification Search .................... 8/158; 68/12.01, 17 R
See application file for complete search history.

(56) References Cited

U.S. PATENT DOCUMENTS

| | | | |
|---|---|---|---|
| 3,650,667 A | | 3/1972 | Luechauer |
| 5,370,743 A | * | 12/1994 | Usui et al. ..................... 134/18 |
| 5,858,191 A | * | 1/1999 | DiMascio et al. ........... 204/524 |
| 6,766,812 B1 | | 7/2004 | Gadini |
| 2003/0194522 A1 | * | 10/2003 | Kurimoto et al. ......... 428/36.91 |
| 2004/0007249 A1 | * | 1/2004 | Kishi et al. .................... 134/2 |

FOREIGN PATENT DOCUMENTS

WO  WO00/64325  * 11/2000

OTHER PUBLICATIONS

International Search Report, PCT/US2005/038277, 1 page.

* cited by examiner

*Primary Examiner*—Michael Barr
*Assistant Examiner*—Jason Heckert
(74) *Attorney, Agent, or Firm*—Julie A. McConihay; Leonard W. Lewis; Steven W. Miller

(57) ABSTRACT

A method for cleaning within a washing zone comprising: placing at least one article for treatment in the washing zone, providing of at least partially deionized water into the washing zone, and optionally providing cleaning composition into the washing zone wherein the combination of said optional cleaning composition and partial deionized water have a specific conductance of less than about 200 μS/cm.

10 Claims, No Drawings

METHODS FOR CLEANING LAUNDRY WITH REDUCED SORTING

CROSS REFERENCE TO RELATED APPLICATIONS

This application claims the benefit of EP Patent Application No. 04252837.2, filed May 17, 2004, EP Patent Application No. 04252849.7, filed May 17, 2004, EP Patent Application No. 04252846.3, filed May 17, 2004, EP Patent Application No. 04252838.0, filed May 17, 2004, EP Patent Application No. 04252853.9, filed May 17, 2004, EP Patent Application No. 04252851.3, filed May 17, 2004, EP Patent Application No. 04252845.5 and U.S. application Ser. No. 10/967,757, filed Oct. 18, 2004.

BACKGROUND OF THE INVENTION

Many methods for cleaning or processing laundry are known in the art. Indeed, conventional methods for washing laundry have been utilized for many years. However, given the continued use of these methods, there are still significant areas where improvement is needed.

Methods of washing laundry have included the sorting of laundry into colored laundry articles—including dark colored laundry articles and light colored laundry articles, white laundry articles, and the like. Without wishing to be bound by theory, it is believed that this sorting process is necessary to prevent color and/or dye bleeding onto light colored laundry articles and/or white laundry articles. This sorting process represents a significant burden to the consumer, who must manually go through the laundry and sort it into various groupings. Further, the consumer risks making mistakes during the sort process. In a nonlimiting example, a red laundry article containing dyes and/or pigments laundered with white laundry articles may cause all of the white laundry articles to have a pink cast, potentially rendering the laundry articles unappealing and unattractive.

While attempts have been made to minimize the dye transfer within the washing machine, there has to date been no wash method that would substantially eliminate the need to sort clothing.

It is, therefore, highly desirable to launder or wash laundry articles without the need to sort them by color. Further, it is highly desirable to prevent the transfer of dyes within the laundry machine among laundry articles. This invention accomplishes these goals.

SUMMARY OF THE INVENTION

The present invention relates to a method for cleaning within a washing zone comprising placing at least one article for treatment in the washing zone, providing of at least partially deionized water into the washing zone, and optionally providing cleaning composition into the washing zone wherein the combination of said optional cleaning composition and partial deionized water have a specific conductance of less than about 200 μS/cm. In one embodiment, the at least partially deionized water is at least partially provided by a water softening zone. In one embodiment, the water softening zone comprises nanofiltration, electrodeionization, electrodialysis, reverse-osmosis, distillation, capacitive deionization and combinations thereof. In one embodiment, the capacitive deionization zone comprises at least one electrode comprising activated carbon, graphite, carbon aerogel, pyrolyzed polymer, carbon nanotubes, transition metal oxides and combinations thereof.

In one embodiment, the at least partially deionized water has comprised a specific conductance of less than about 200 μS/cm. In one embodiment, the optional cleaning composition has a specific conductance of less than about 200 μS/cm. In one embodiment, the combination of said optional cleaning composition and partial deionized water have comprise a specific conductance of less than about 150 μS/cm. In one embodiment, the present invention further comprises providing mechanical energy to the washing zone. In one embodiment, the present invention further comprises providing an anti-redeposition agent to the washing zone. In one embodiment, the optional cleaning compositions further comprises at least one anti-redeposition agent.

The present invention also relates to a method for treating stains within a washing zone comprising placing at least one article for treatment in the washing zone, providing of a deionized water into the washing zone, and providing cleaning composition into the washing zone wherein the deionized water has a specific conductance of less than about 200 μS/cm and wherein the combination of said cleaning composition and partial deionized water has a specific conductance of less than about 200 μS/cm. In one embodiment, the at least partially deionized water is at least partially provided by a water softening zone. In one embodiment, the water softening zone comprises nanofiltration, electrodeionization, electrodialysis, reverse-osmosis, distillation, capacitive deionization and combinations thereof. In one embodiment, the capacitive deionization zone comprises at least one electrode comprising either activated carbon, or graphite, or carbon aerogel, or pyrolyzed polymer, or carbon nanotubes, or transition metal oxides. In one embodiment the least partially deionized water has a specific conductance of less than about 100 μS/cm. In one embodiment, the optional cleaning composition has a specific conductance of less than about 100 μS/cm. In one embodiment, the combination of said optional cleaning composition and partial deionized water has a specific conductance of less than about 100 μS/cm. In one embodiment, the present invention further comprises at least one anti-redeposition agent. In one embodiment, the present invention further comprises providing an anti-redeposition agent to the washing zone.

The present invention also relates to a method for cleaning within a washing zone comprising: providing instructions to a user, said instructions indicating to the user that it is not required to sort the laundry.

DETAILED DESCRIPTION OF THE INVENTION

While the specification concludes with the claims particularly pointing and distinctly claiming the invention, it is believed that the present invention will be better understood from the following description.

The compositions of the present invention can include, consist essentially of, or consist of, the components of the present invention as well as other ingredients described herein. As used herein, "consisting essentially of" means that the composition or component may include additional ingredients, but only if the additional ingredients do not materially alter the basic and novel characteristics of the claimed compositions or methods.

All percentages and ratios used herein are by weight of the total composition and all measurements made are at 25° C., unless otherwise designated. An angular degree is a planar unit of angular measure equal in magnitude to $\frac{1}{360}$ of a complete revolution.

All measurements used herein are in metric units unless otherwise specified.

The term "product" and/or "cleaning composition" as used herein encompasses both active-based detergent compositions suitable for washing and cleaning of soiled substrates as well as auxiliary compositions suitable for use after washing or in conjunction with active-based detergents and designed to provide an ancillary substrate benefit or effect, for example, finishing agents, rinsing agents, fabric enhancers designed to provide post-wash fabric care benefits, and detergent auxiliaries designed to provide post-wash surface care benefits. The terms "product dispensing zone," "product storage means," etc., should be construed accordingly.

The term "feed water" as used herein encompasses water directly from the mains including municipally available water and ground water, from the mains or used-water reservoir such as a recycle reservoir used for storage of recycled water, a storage tank, or from a combination thereof.

The term "laundry" as used herein encompasses woven and non-woven fabric. Non-limiting uses for this fabric include clothing, bedding, towels, and the like.

The term "dye" as used herein encompasses any material capable of imparting a color to laundry including, but not limited to, all matter of dyes, pigments, colorants, and the like.

The term "sort" as used herein encompasses the separation of various colors and/or shadings into similar groupings, such as white laundry, dark colored laundry, light colored laundry, red laundry, blue laundry, and the like, as well as the separation by material, suggested wash temperatures, soil type, bleeding colors, and the like.

The term "bleeding" as used herein refers to the giving off and/or leaching of dyes and/or pigments contained on and/or within laundry when placed in an aqueous environment.

The term "S" when related to specific conductance refers to the unit measurement of a siemens, $1\ S = 1\ s^3 \cdot A^2 \cdot kg^{-1} \cdot m^{-2}$.

It has now surprisingly been discovered that the method of the present invention provides increased cleaning and washing efficacy. Further, the methods of the present invention can be utilized to reduce the sorting of laundry. According to a first aspect of the present invention, there is provided a method for cleaning within a washing zone comprising: placing at least one article for treatment in the washing zone, providing of at least partially deionized water into the washing zone, and optionally providing cleaning composition into the washing zone, wherein the combination of said optional cleaning composition and partially deionized water have an overall specific conductance of less than 200 µS/cm. In a second aspect of the invention, there is provided a method for cleaning within a washing zone comprising placing at least one article for treatment in the washing zone, providing of at least partially deionized water into the washing zone, providing an anti-redeposition agent and optionally providing cleaning composition into the washing zone, wherein the combination of said optional cleaning composition, anti-redepositon agent, and partially deionized water have an overall specific conductance of less than 200 µS/cm.

Without wishing to be bound by theory, it is believed that the methods of the current invention function by optionally combining deionized water with dispersant, chelant, builder, and/or anti-redeposition chemistries. The low levels of residual cations are hypothesized to decrease the amount of anionic dyes and/or other particulate soils from depositing on laundry. Cationic species, including those with divalent charge, can decrease the solubility/dispersability of particulate species, including organic and inorganic pigments, clays, etc., via bridging mechanisms, effectively forming larger, less soluble aggregates in the washing zone. Cationic species can also ion pair with anionic groups on dye and/or particulate species, and also on laundry, to reduce their anionic charge. Greater anionic charge repulsion mitigates any fabric-soil and soil-soil interactions that lead to redeposition on laundry. Maintaining the maximum anionic charge on particulate soils and fabric surfaces allows for maximizing soil dispersion, minimizing deposition of soil on fabric surfaces, and preventing aggregation of particulate soils. Therefore, when cations are present, dyes redeposit from bleeding laundry to other laundry, which is thought to occur by the neutralization effect and/or via salt bridging of the dye to the fabric.

The present invention also addresses the problem of color fidelity in laundered fabrics. It has been determined that metal cations, especially transition metals, and most particularly copper and nickel ions, present in conventional aqueous wash and/or rinse baths can undesirably interact with fabric dyes and change their perceived hue. This also often translates into a darkening of the dye material, which tends to cause the colored fabrics to appear drab and resulting in a loss of color fidelity and brightness. The at least partially softened water in the present invention circumvents the adverse effects of transition metals on colored fabrics by removing these metals prior to contact with dyed fabrics.

While not intending to be limited by theory, it may be speculated that functional substituent groups present in complex dye molecules bind with metal ions, thereby causing a change in color which is generally perceived as drabness and an overall appearance of fabric aging. Whatever the reason for the drabness and change in appearance, it has now been discovered that such problems associated with loss of color fidelity can be overcome by the methods and compositions herein.

Moreover, the invention also can be used to remove metal ions which have already combined with dye or optical brightener molecules on fabrics in prior laundering processes, thereby providing a restorative benefit to colors which have become drab due to metal ion interactions, especially due to interactions with copper cations and nickel cations, but also manganese cations, iron cations, and transition metal cations, among others.

In one aspect, the dispersant, chelant, builder, and/or anti-redeposition chemistries are used to at least partially reduce the deposition of dyes from bleeding laundry onto the remaining laundry. It is further believed that while the deionized water alone is capable of reducing deposition of dyes onto laundry, the deionized water acts synergistically with the chelant, builder, and/or anti-redeposition chemistries to provide additional reduction in the deposition of dyes onto laundry. Without wishing to be bound by theory, it is believed that the anti-redeposition chemistries agent chemically and/or physically bind with dyes that are in solution in the washing zone. Further, the efficiency of the chelant, builder, and/or anti-redeposition chemistries in deionized water are substantially improved, as the chelant, builder, and/or anti-redeposition chemistries do not have to compete with ionic species from water.

It is contemplated that the methods of the present invention can be used for residential laundry as well as commercial laundry, including commercial industries such as hospitals, restaurants, hotels, and the like.

Specific Conductance

The specific conductance depends on the total concentration of the dissolved ionized substances, i.e., the ionic strength of a water sample. As used herein, it is an expression of the ability of the water to conduct an electric current. For example, freshly distilled water has a conductance of 0.5-2 µS/cm, whereas that of potable water generally is 50-1500

μS/cm. The method of determining the specific conductance in the present invention utilizes the following test: ASTM D5391-99 (2005): Standard Test Method for Electrical Conductivity of Flowing High Purity Water Samples.

In one embodiment, the combination of laundry, deionized water, optional anti-redeposition agent, and/or optional cleaning compositions as measured in the washing zone, has a specific conductance of less than about 200 μS/cm, in another less than about 150 μS/cm, in yet another embodiment less than about 100 μS/cm, in another less than 75 μS/cm, in another less than 50 μS/cm, in still another embodiment from about 0.01 μS/cm to about 200 μS/cm, in yet still another embodiment from about 0.1 μS/cm to about 100 μS/cm, in even still another embodiment from about 1 μS/cm to about 50 μS/cm.

In another embodiment, the combination deionized water, and optionally any combination of anti-redeposition agent, laundry, and/or optional cleaning compositions as measured in the washing zone, has a specific conductance of less than about 200 μS/cm, in another less than about 150 μS/cm, in yet another embodiment less than about 100 μS/cm, in another less than 75 μS/cm, in another less than 50 μS/cm, in still another embodiment from about 0.01 μS/cm to about 200 μS/cm, in yet still another embodiment from about 0.1 μS/cm to about 100 μS/cm, in even still another embodiment from about 1 μS/cm to about 50 μS/cm.

Washing Zone

The washing zone of the present invention includes areas whereby cleaning of articles takes place. Washing zones of the present are included in both top and front loading laundry washing machines, dishwashers and the like. In one embodiment, mechanical energy is generated from within the washing zone to improve cleaning and/or increase the kinetic energy within the washing zone. In one embodiment, the mechanical energy is added to the washing zone by agitating the washing zone by the moving of the washing zone or by moving of an agitator within the washing zone. The agitator within the washing zone is capable of oscillating, moving, rotating, and/or revolving in such a manner that it result is mechanical energy being added to the washing zone in the form of the moving of the water and/or laundry within the washing zone.

Articles

Articles of the present invention include any item capable of being cleaned within a washing zone. In one embodiment, articles include laundry, including clothing, tablecloths, sheets, and the like. One of ordinary skill in the art would readily know what type of article to place within a washing zone to achieve the desired result.

Systems and devices of the present invention are also advantageous in that water softening takes place without the use of ion exchange resins. Also, the increased cleaning benefit produced by the present invention results in less water/energy use to achieve an equivalent cleaning benefit versus water not treated by the present invention.

Deionized Water

According to the invention, the method herein comprises providing at least a partially deionized water into the washing zone. In the methods of the invention, the partially deionized water is produced by a water-softening zone comprises one or more devices comprising from nanofiltration, electrodeionization, electrodialysis, reverse-osmosis, distillation, and capacitive deionization and combinations thereof. In one embodiment, the water-softening zones can include those disclosed in the commonly-assigned and co-filed patent application in the name of Baeck, Convents and Smets, applicant's reference number CM2849F, said application being incorporated by reference herein and described in detail below.

In one embodiment, the water softening zone is effective to soften the water to a specific conductance of less than about 200 μS/cm, in another less than about 150 μS/cm, in yet another embodiment less than about 100 μS/cm, in another less than 75 μS/cm, in another less than 50 μS/cm, in still another embodiment from about 0.01 μS/cm to about 200 μS/cm, in yet still another embodiment from about 0.1 μS/cm to about 100 μS/cm, in even still another embodiment from about 1 μS/cm to about 50 μS/cm.

It is, however, well known that technologies for increasing water softness will remove ionic species, including, but not limited to cationic species, anionic species, zwitterionic species, amphoteric species and combinations thereof. Such cationic species include, but are not limited to, calcium, iron, magnesium, manganese, sodium and mixtures thereof. Such anionic species include, but are not limited to, chlorine, fluorine, carbonate and mixtures thereof.

Downstream of the water-softening zone and in fluid communication therewith, the washing system can additionally comprise a softened water reservoir for storing and delivering at least partially softened water to the washing zone.

Without wishing to be bound by theory, it is believed that the water-softening zone forms an at least a partially softened water. The partially softened water, when transferred to the washing zone, increases the efficacy of any cleaning composition added to the washing zone. Further, it is believed that the at least partially softened water lengthens the usable life of components of the washing system, as the use of at least partially softened water reduces and/or prevents the build up of hard water deposits, scales, and the like resulting in cleaner washing system components.

Downstream of the water-softening zone and in fluid communication therewith, the washing system can additionally comprise a softened water reservoir for storing and delivering at least partially softened water to the washing zone.

Capacitive Deionization

In one embodiment, the water-softening zone utilizes capacitive deionization. Capacitive deionization units utilize charged electrodes for softening of the water. Capacitive deionization with electrodes is capable of removing ionic species and other impurities from water without the addition of other ions as is typical of an ion exchange water softener. Other forms of capacitive deionization include flow through capacitors which utilize similar fundamental physics. For the purposes of this invention capacitive deionization units include flow-thorough capacitors. Without wishing to be bound by theory, water is passed between electrodes kept at a low potential difference and/or voltage. When the electrodes become saturated with ionic species, the electrodes are electrostatically regenerated, and ionic species are expelled as a waste electrolyte stream. Electrode regeneration involves periodically purging the electrodes of ionic species by reversing electrode polarity and flushing with water to form a waste electrolyte stream or by grounding the plates and flushing them with water to form a waste electrolyte stream. Further, the electrodes can be regenerated of adsorbed materials by contacting the electrodes with acidic streams and/or caustic streams. In one embodiment, these acidic and/or basic streams are generated by an electrolysis unit.

In one embodiment, the electrodes of the capacitive deionization units are made from carbon aerogels. Carbon aerogel electrodes are found in U.S. Pat. No. 6,309,532 to Tran et el.

Carbon-aerogel electrodes have excellent chemical stability and a very high surface area per unit volume.

In one embodiment, carbon aerogels are made utilizing various carbon systems. These systems are often, though not necessarily made by pyrolisis. These carbon systems include, but are not limited to, resorcinol/formaldehyde resorcinol/phenol/formaldehyde, hydroquinone/resorcinol/formaldehyde, phloroglucinol/resorcinol/formaldehyde, catechol/resorcinol/formaldehyde, polyvinyl chloride, phenol/formaldehyde, epoxidized phenol/formaldehyde, polyvinyl chloride, phenolibenzaldehyde, oxidized polystyrene, polyfurfuryl alcohol, polyvinyl alcohol, polyacrylonitrile, polyvinylidene chloride, cellulose, polybutylene, cellulose acetate, melamine/formaldehyde, polyvinyl acetate, ethyl cellulose, epoxy resins, acrylonitrile/styrene, polystyrene, polyamide, polyisobutylene, polyethylene, polymethyl-methacrylate, polyvinyl chloride/divinylbenzene, divinylbenzene/styrene, and combinations and mixtures thereof.

Other sources can be utilized to form electrodes for use in capacitive deionization units. In one embodiment, electrodes exemplified are U.S. Pat. No. 6,737,445 to Bell et al. and U.S. Application No. 20030153636 to Dietz et al. are utilized, whereby these references are incorporated by reference. Further, the electrodes may be arranged in a flow through fashion, as described in U.S. Pat. No. 6,462,935 to Shiue et al. and U.S. Application No. 20040095706 to Faris et al., whereby these references are incorporated by reference.

Additional electrode sources for use in capacitive deionization units are exemplified in the following U.S. patents and patent applications, all hereby incorporated by reference: U.S. Pat. Nos. 5,425,858; 5,636,437; 5,954,937; 5,980,718; 6,309,532; 6,346,187; and 6,761,809. U.S. Patent Publication Nos. 2002-0084188 and 2004-0188246.

Further electrode sources, utilized in flow-through capacitors by the referenced materials as, for use in capacitive deionization units are exemplified in the following references, all hereby incorporated by reference: U.S. Pat. Nos. 5,192,432; 5,415,768; 5,547,581; 5,620,597; 5,748,437; 5,779,891; 6,127,474; 6,325,907; 6,413,409; 6,628,505; 6,709,560; 6,778,378; and 6,781,817. U.S. Patent Publication Nos. 2004-0012913 and 2004-0174657. WO 01/66217 and WO 03/009920.

In one embodiment, the flow rate of feed water treated with capacitive deionization to make an at least partially softened water is from about 0.5 liters/min to about 20.0 liters/min, in another embodiment from about 0.75 liters/min to about 8 liters/min, in yet another embodiment from about 1 liters/minute to about 5 liters/min, in still another embodiment greater than about 1 liter/minute.

In one embodiment, the overall surface area of the electrodes utilized in the capacitive deionization unit is from about 200 to about 1500 $m^2/g$; in another embodiment from about 400-1200 $m^2/g$; in another embodiment from about 500-1000 $m^2/g$.

In one embodiment the potential difference or voltage is from about 0.5 volts to about 10 volts; in another embodiment from about 0.75 to about 8 volts; in yet another embodiment from about 1 to about 5 volts.

In one embodiment, the capacitive deionization unit is capable of self-cleaning. In one self-cleaning embodiment, cleaning commences when the electrodes exhibit diminished adsorption of the ionic species from the solution as noted by the decrease in the resistively of the outlet water—water processed by the washing systems of the present invention—and/or a decrease in the level of hardness reduction. In one embodiment, the decreased performance of the electrodes is observed by a conductivity meter. One of ordinary skill in the art would readily be able to determine means of measuring the decrease in performance of the electrodes of the present invention. The decreased performance, in one embodiment, is measured by dividing the conductivity of the "dirty" electrode—an electrode containing ionic species gathered by operation of the washing systems—by the conductivity of the "clean" electrode—electrode before the use of the washing systems, whereby clean electrode in one embodiment is substantially free of ionic species—to determine the conductivity fraction. When the conductivity fraction reaches a predetermined value, a self-cleaning cycle is initiated. In one embodiment, a self-cleaning cycle is initiated when the conductivity fraction is less than about 0.9, in another embodiment, the conductivity fraction is less than about 0.7, in yet another embodiment, the conductivity fraction is less than about 0.5, in yet another embodiment, the conductivity fraction is less than about 0.4, in yet another embodiment, the conductivity fraction is less than about 0.3, in yet another embodiment, the conductivity fraction is less than about 0.2, in yet another embodiment the conductivity fraction is between about 0.1 and about 0.6, in yet another embodiment the conductivity fraction is between about 0.2 and 0.4.

Optionally, the capacitive deionization unit further comprises a prefilter. Without wishing to be bound by theory, it is believed that the prefilter is capable of extending the life of the electrodes, as well as delaying the frequency of the self-cleaning cycle of the electrodes. It is believed that the prefilter absorbs, blocks, or otherwise removes the neutrally charged species contained in feed water. Such neutrally charges species are minimally affected by the electrodes on the capacitive deionization unit and thus are capable of contaminating the adsorption sites on the electrodes. The prefilter of the present invention is made from any material that substantially absorbs, blocks, and/or otherwise removes neutrally charged species from feed water. Such materials include, but are not limited to, activated carbon, silica, paper, metallic mesh filters, membranes, gels, and combinations thereof.

Housing for Washing Zone and/or Water-Softening Zone

In one embodiment, it is contemplated that the washing systems of the present invention are contained substantially within one housing. Without wishing to be bound by theory, it is believed that by housing the washing systems of the present invention substantially within one housing minimizes any plumbing or fluid connections necessary among the elements of the washing system. Also, housing the washing systems of the present invention substantially within one housing minimizes the volume and/or space required by the washing systems of the present invention.

In another embodiment, it is contemplated that the washing zone and the water softening zone are independently housed. Such an embodiment is contemplated with washing systems that are at the point-of-use. In one non-limiting example, it is contemplated that the water-softening zone of the present invention is located in a different housing than the washing zone. The water-softening zone is fluidly connected between the inlet water stream and the inlet of the washing zone. In such an embodiment, its is contemplated that existing devices utilizing feed water, including washing zones comprising washing machines and automatic dishwashing machines, water heaters, as well as "whole-house" inlet streams may be retrofitted and/or adapted to have such water softening zones present to treat feed water.

In one embodiment, it is contemplated that the water-softening zone of the present invention is located in a different housing than the washing zone. The water-softening zone is fluidly connected between the feed water and the inlet of the washing zone. In such an embodiment, its is contemplated that existing devices utilizing feed water, including washing zones comprising washing machines and automatic dishwashing machines, water heaters, as well as "whole-house" inlet streams may be retrofitted and/or adapted to have such water softening zones present to treat feed water from the water supply.

In one embodiment, the washing system comprises a water-softening appliance comprising the water-softening zone and a washing appliance comprising the washing zone in hyphenated form, whereby the water-softening appliance and its associated water-softening zone forms a stand-alone unit that can be either permanently or temporarily fitted to the feed water inlet conduits of the washing appliance as required by the user, any power supply required for the water-softening appliance being taken either from the power supply for the washing appliance or separately from the mains power supply.

In one embodiment, it is also contemplated that the water-softening zone and the washing zone are contained substantially within one housing. Without wishing to be bound by theory, it is believed that housing the water-softening zone and the washing zone substantially within one housing minimizes any plumbing or fluid connections. Also, housing the water-softening zone and the washing zone substantially within one housing minimizes the volume and/or space required.

In one embodiment, the water-softening zone and the washing zone form of an integral water-softening and washing appliance wherein the water-softening zone and washing zone are built into and form part of a single appliance with the two zones in fluid communication with one another via the conduits of the appliance.

Anti-Redeposition Agents

The anti-redeposition agent of the present invention may be selected from any composition that slows or prevents the deposition of dyes onto laundry. Such compositions include those found in U.S. Pat. No. 5,849,684, the entirety of which is incorporated by reference. Additional anti-redeposition agents include nitrogen containing compounds with pKa's above 7, where the nitrogen containing compounds are capable of being protonated in the wash process described herein. One type of nitrogen containing compounds further include a polymer capable of noncovalently bonding to a dye molecule in solution and maintaining in a solution as a dispersion, while not being deposited on the fabric.

Other anti-redeposition agents include, but are not limited to, polyvinyl pyrrolidine; Lupasol; chitosan; hydrophobic ($C_{12}$-$C_{24}$) amines comprising branched, linear, saturated or unsaturated, primary, secondary, or tertiary forms; aminosilicones, and mixtures thereof. Aminosilicones, as used herein, include the functionalized, nitrogen-containing silicones. These are materials wherein the organic substituents of the silicon atoms in the polysiloxane chain contain one or more amino and/or quaternary ammonium moieties. The terms "amino" and "ammonium" in this context most generally means that there is at least one substituted or unsubstituted amino or ammonium moiety covalently bonded to, or covalently bonded in, a polysiloxane chain and the covalent bond is other than an Si—N bond, e.g., as in the moieties —[Si]—O—CR'$_2$—NR$_3$, —[Si]—O—CR'$_2$—NR$_3$— [Si]—OCR'$_2$—N$^+$R$_4$, —[Si]—OCR'$_2$—N$^+$HR$_2$—[Si]—O—CR'$_2$—N$^+$HR$_2$—[Si]—CR'$_2$—NR$_3$ etc. where —[Si]— represents one silicon atom of a polysiloxane chain. Amino and ammonium functionalized silicones as fabric treatment agents are described, for example, in EP-A-150,872; EP-A-577,039; EP-A-1,023,429; EP-A-1,076,129; and WO 02/018528.

Anti-redeposition agents of the present invention also include dye transfer inhibiting agents. Generally, such dye transfer inhibiting agents include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents typically comprise from about 0.01% to about 10% by weight of the composition, preferably from about 0.01% to about 5%, and more preferably from about 0.05% to about 2%.

More specifically, the polyamine N-oxide polymers preferred for use herein contain units having the following structural formula: R-Ax-Z; wherein Z is a polymerizable unit to which an N—O group can be attached or the N—O group can form part of the polymerizable unit or the N—O group can be attached to both units; A is one of the following structures: —NC(O)—, —C(O)O—, —S—, —O—, —N═; x is 0 or 1; and R is aliphatic, ethoxylated aliphatics, aromatics, heterocyclic or alicyclic groups or any combination thereof to which the nitrogen of the N—O group can be attached or the N—O group is part of these groups. Preferred polyamine N-oxides are those wherein R is a heterocyclic group such as pyridine, pyrrole, imidazole, pyrrolidine, piperidine and derivatives thereof.

The N—O group can be represented by the following general structures: [Figure] wherein R1, R2, R3 are aliphatic, aromatic, heterocyclic or alicyclic groups or combinations thereof; x, y and z are 0 or 1; and the nitrogen of the N—O group can be attached or form part of any of the aforementioned groups. The amine oxide unit of the polyamine N-oxides has a pKa<10, preferably pKa<7, more preferred pKa<6.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof. These polymers include random or block copolymers where one monomer type is an amine N-oxide and the other monomer type is an N-oxide. The amine N-oxide polymers typically have a ratio of amine to the amine N-oxide of 10:1 to 1:1,000,000. However, the number of amine oxide groups present in the polyamine oxide polymer can be varied by appropriate copolymerization or by an appropriate degree of N-oxidation. The polyamine oxides can be obtained in almost any degree of polymerization. Typically, the average molecular weight is within the range of 500 to 1,000,000; more preferred 1,000 to 500,000; most preferred 5,000 to 100,000. This preferred class of materials can be referred to as "PVNO".

The most preferred polyamine N-oxide useful in the rinse added compositions and processes herein is poly(4-vinylpyridine-N-oxide) which as an average molecular weight of about 50,000 and an amine to amine N-oxide ratio of about 1:4.

Copolymers of N-vinylpyrrolidone and N-vinylimidazole polymers (referred to as a class as "PVPVI") are also preferred for use herein. Preferably the PVPVI has an average molecular weight range from 5,000 to 1,000,000, more preferably from 5,000 to 200,000, and most preferably from 10,000 to 20,000. (The average molecular weight range is determined by light scattering as described in Barth, et al., Chemical Analysis, Vol 113. "Modern Methods of Polymer Characterization", the disclosures of which are incorporated herein by reference.) The PVPVI copolymers typically have a molar ratio of N-vinylimidazole to N-vinylpyrrolidone from 1:1 to 0.2:1, more preferably from 0.8:1 to 0.3:1, most preferably from 0.6:1 to 0.4:1. These copolymers can be either linear or branched.

The present compositions also may employ a polyvinylpyrrolidone ("PVP") having an average molecular weight of from about 5,000 to about 400,000, preferably from about 5,000 to about 200,000, and more preferably from about 5,000 to about 50,000. PVP's are known to persons skilled in the detergent field; see, for example, EP-A-262,897 and EP-A-256,696, incorporated herein by reference. Compositions containing PVP can also contain polyethylene glycol ("PEG") having an average molecular weight from about 500 to about 100,000, preferably from about 1,000 to about 10,000. Preferably, the ratio of PEG to PVP on a ppm basis delivered in wash solutions is from about 2:1 to about 50:1, and more preferably from about 3:1 to about 10:1.

In one embodiment, the anti-redeposition agent has a specific conductance of less than about 200 μS/cm, in another less than about 150 μS/cm, in yet another embodiment less than about 100 μS/cm, in another less than 75 μS/cm, in another less than 50 μS/cm, in still another embodiment from about 0.01 μS/cm to about 200 μS/cm, in yet still another embodiment from about 0.1 μS/cm to about 100 μS/cm, in even still another embodiment from about 1 μS/cm to about 50 μS/cm.

Optional Cleaning Composition

Optional cleaning compositions include, but are not limited to, builders, surfactants, enzymes, bleach activators, bleach catalysts, bleach boosters, bleaches, alkalinity sources, antibacterial agents, colorants, perfumes, pro-perfumes, finishing aids, lime soap dispersants, odor control agents, odor neutralizers, polymeric dye transfer inhibiting agents, crystal growth inhibitors, photobleaches, heavy metal ion sequestrants, anti-tarnishing agents, anti-microbial agents, anti-oxidants, soil release polymers, electrolytes, pH modifiers, thickeners, abrasives, divalent or trivalent ions, metal ion salts, enzyme stabilizers, corrosion inhibitors, diamines or polyamines and/or their alkoxylates, suds stabilizing polymers, solvents, process aids, fabric softening agents, optical brighteners, hydrotropes, suds or foam suppressors, suds or foam boosters and mixtures thereof.

In one embodiment, the optional cleaning composition has a specific conductance of less than about 200 μS/cm, in another less than about 150 μS/cm, in yet another embodiment less than about 100 μS/cm, in another less than 75 μS/cm, in another less than 50 μS/cm, in still another embodiment from about 0.01 μS/cm to about 200 μS/cm, in yet still another embodiment from about 0.1 μS/cm to about 100 μS/cm, in even still another embodiment from about 1 μS/cm to about 50 μS/cm.

Instructions for Use

In one embodiment, the methods of the present invention further include providing user instructions. In one embodiment, the instructions state that the user is not required to sort laundry. In another embodiment, the instructions state the user can place laundry into the washing zone without sorting. In another embodiment, the instructions state that the user may place any combination of colors into the washing zone without sorting. In yet another embodiment, the instructions state that the user may place laundry into the washing zone by separating only into white laundry and colored laundry. The instructions for the user can be memorialized in any form capable of comprehension by a user. As a nonlimiting example, these instructions included printed paper, electronic displays, radio frequency identification, i.e., RFID tags, audible indicators, and the like.

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for cleaning within a washing zone comprising:
   placing at least one article for treatment in the washing zone, wherein the article comprises laundry;
   providing mechanical energy to the washing zone;
   providing at least partially deionized water into the washing zone, and
   providing a cleaning composition and an anti-redeposition agent into the washing zone wherein the combination of said cleaning composition, anti-redeposition agent and the at least partially deionized water have a specific conductance from about 0.1 μS/cm to about 100 μS/cm and further wherein the at least partially deionized water is at least partially provided by a water softening zone comprising a capacitive deionization zone comprising at least one electrode comprising activated carbon, graphite, carbon aerogel, pyrolyzed polymer, carbon nanotubes, transition metal oxides or combinations thereof.

2. The method of claim 1, wherein the water softening zone comprises one or more devices selected from nanofiltration, electrodeionization, electrodialysis, reverse-osmosis, distillation and combinations thereof.

3. The method of claim 1, wherein the at least partially deionized water has a specific conductance of less than about 75 μS/cm.

4. The method of claim 1, wherein the cleaning composition has a specific conductance of less than about 75 μS/cm.

5. A method for treating stains within a washing zone comprising:
   placing at least one article for treatment in the washing zone,
   providing mechanical energy to the washing zone;
   providing of a deionized water into the washing zone, and
   providing a cleaning composition and an anti-redeposition agent into the washing zone wherein the combination of said cleaning composition, anti-redeposition agent and partial deionized water has a specific conductance from about 0.1 μS/cm to about 100 μS/cm and further wherein the at least partially deionized water is at least partially provided by a water softening zone comprising a capacitive deionization zone comprising at least one electrode comprising activated carbon, graphite, carbon aerogel, pyrolyzed polymer, carbon nanotubes, transition metal oxides or combinations thereof.

6. The method of claim 5, wherein the water softening zone comprises one or more devices selected from nanofiltration, electrodeionization, electrodialysis, reverse-osmosis, distillation and combinations thereof.

7. The method of claim 5, wherein the at least partially deionized water has a specific conductance of less than about 75 μS/cm.

8. The method of claim 5, wherein the cleaning composition has a specific conductance of less than about 75 μS/cm.

9. The method of claim 1, wherein the anti-redeposition agent comprises polyvinyl pyrolidine, Lupasol, chitosan, hydrophobic amines, aminosilicones, or mixtures thereof.

10. The method of claim 5, wherein the anti-redeposition agent comprises polyvinyl pyrolidine, Lupasol, chitosan, hydrophobic amines, aminosilicones, or mixtures thereof.

* * * * *